F. A. WHITE.
TOOL HOLDER.
APPLICATION FILED DEC. 1, 1913.
1,096,977.
Patented May 19, 1914.
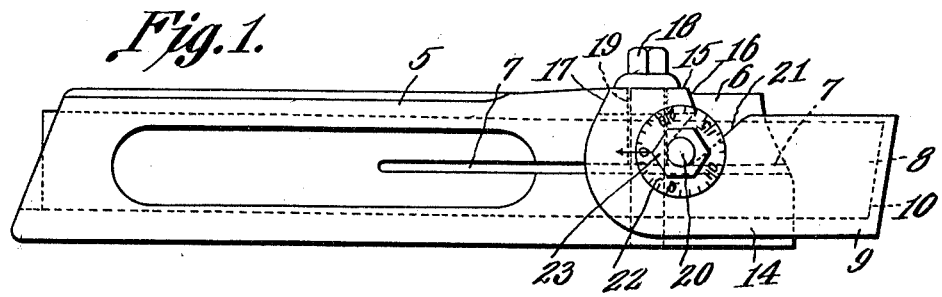
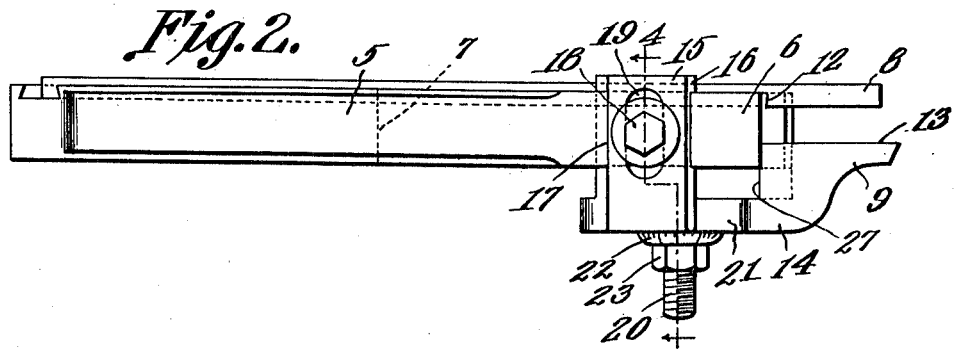
Witnesses
F. A. White,
Inventor
by C. A. Snow & Co.
Attorneys

UNITED STATES PATENT OFFICE.

FREDRICK A. WHITE, OF DENVER, COLORADO.

TOOL-HOLDER.

1,096,977.  Specification of Letters Patent.  Patented May 19, 1914.

Application filed December 1, 1913. Serial No. 804,029.

*To all whom it may concern:*

Be it known that I, FREDRICK A. WHITE, a citizen of the United States, residing at Denver, in the county of Denver and State of Colorado, have invented a new and useful Tool-Holder, of which the following is a specification.

This invention relates to tool holders such as are used in connection with lathes, planers, and allied metal cutting machines.

An object of the present invention is to provide a tool holder which will hold cutting tools in adjustable and spaced relation.

A further object is to provide a tool holder adapted to hold cutting tools in spaced relation, and with the tools so held that the distance therebetween may be adjusted to a nicety.

A further object is to provide a tool holder with an adjusting micrometer screw and with the tool holder so arranged that the forces brought to bear upon the said cutting tools are taken up by parts especially designed to withstand such stresses and wherein the said forces will not be brought to bear upon the micrometer screw.

A further object is to provide a tool holder in which the cutting tools may be moved axially of the holder and held in any desired adjusted position.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a side view in elevation of my improved tool holder with cutting tools positioned therein and held thereby. Fig. 2 is a top plan view of the same. Fig. 3 is a front view in elevation of the tool and tool holder. Fig. 4 is a cross sectional view taken on the line 4—4 of Fig. 2.

Referring to the drawings in which similar reference numerals designate analogous elements throughout the several views, a shank 5 is provided, the front extremity of which is termed the head 6. The shank is of such transverse configuration that it will fit within and be secured to the tool clamp of lathes or allied metal cutting machines.

The head 6 of the tool holder is provided with a transverse slot 7 which extends entirely therethrough and terminates well toward the rear of the shank 5. The transverse slot divides the head into upper and lower portions which have been designated as A and B respectively. The tool holder illustrated in the drawings is particularly adapted to hold tools in proper adjusted relation for the making of piston rings and for which reason the cutting off tool 8 and facing tool 9 are provided. The cutting off tool 8 is provided with a shank 10 the upper and lower edges of which are beveled as at 11 and engage the undercut recess 12 of the tool holder. The cutting off tool 8 may be advanced or retracted independent of the tool holder shank 5.

The facing tool 9 includes the cutting face 13 and the body portion 14 which is formed integral therewith. The body portion 14 is provided with the plate 15 which extends at right angles therefrom. The plate 15 is, as illustrated in Fig. 1, provided with the downwardly diverging or beveled edges 16 which fit within the undercut channel or recess 17 which extends across the upper portion of the head of the tool holder. Thus the facing tool is held for sliding movement in a direction transversely of the tool holder by plate 15 and recess or channel 17. In order to lock the facing tool in its transverse adjusted position and at the same time lock the cutting off tool in its adjusted axial or longitudinal position, the clamping or locking bolt 18 is provided which extends through an elongated slot 19 in the plate 15 down through the head 6 and threadedly engages the same as at 19 which is located below the slot 7 of the head. Thus when the clamping screw is tightened it locks the plate 15 securely within the channel 17 and at the same time draws the divided or parted portions of the head together so that the upper and lower edges of the undercut recess or channel 12 will be drawn into forcible contact with the beveled edges 11 of the cutting or parting tool so that it will be locked rigidly in its adjusted position.

A transversely extending bolt 20 is carried by the head of the tool holder and extends through a suitable aperture 21 in the body portion of the facing tool and provides means whereby the position of the facing tool may be adjusted to a nicety and at the same time the distance between the edge of the facing tool and the edge of the parting or cutting off tool may be calibrated and adjusted directly in fractional parts of an inch. The adjusting bolt 20 is provided with a certain and definite number of threads to the inch and the washer 22 which is carried by the adjusting nut 23 is divided into a number of equally spaced divisions ranging in the present drawings from zero to twenty-five so that if the bolt be provided with forty threads to the inch, a single division of the washer 22 will be equal to an adjustment or movement of the spacing tool of 1/1000 of an inch. The adjusting nut 23 carries a sleeve 24 to the extremity of which is secured the collar 25. The collar 25 seats within a suitable recess 26 formed in the aperture 21 so that the spacing tool will be positively moved in either direction according to the direction of rotation of the nut. The spacing tool is provided with a shoulder or bearing surface 27 which is symmetrical with the front end of the shank 5 against which it contacts so as to take up the stresses and strains incident to the cutting of the piston rings.

Having thus fully described my invention, what I claim is:—

1. A tool holder comprising a head, a transverse slot extending longitudinally thereof and therethrough, said head provided with a longitudinal recess extending along one face thereof, a cutting tool disposed within said recess, a second cutting tool slidably engaging said head, and clamping means in direct engagement with the second mentioned cutting tool locking the same to the head, and said clamping means drawing the portions of the head upon opposite sides of the slot together for the frictional engagement thereof with the said first mentioned cutting tool.

2. A tool holder comprising a transversely slotted head, said slot extending longitudinally of the head, said head provided with a recess extending along one side thereof and in the upper and lower edge portions as defined by the slot, a cutting tool positioned within said recess, a second cutting tool contacting with one portion of said head, and clamping means engaging one portion of said head adapted to draw the other portion thereof toward the same to bring the edges of the recess into forced and frictional engagement with the first mentioned cutting tool to lock the same in place, said clamping means further engaging the second mentioned cutting tool and rigidly securing the same to the portion of the head with which it contacts.

3. A tool holder comprising a transversely slotted head with the slot extending longitudinal of the head and transversely therethrough, the portions of the head divided or defined by the slot being herein termed A and B, the said head provided with a longitudinally extending recess terminating in A and B, a cutting tool disposed within the said recess, a second cutting tool with a portion thereof in contact with the head portion A, and clamping means contacting with a portion of the second cutting tool and bearing down upon A and threadedly engaging B adapted to draw the second mentioned cutting tool in rigid contact with and to lock it to the portion A and to draw the portions A and B together to rigidly clamp the first mentioned cutting tool in said recess.

4. A tool holder comprising a longitudinally slotted head which slot extends transversely therethrough, the said head provided with a recess therein extending above and below said slot, a cutting tool positioned within said recess, a second cutting tool provided with a transversely extending plate, said plate extending transversely across the upper portion of said head, and a clamping bolt extending through the said transversely extending plate of the second mentioned cutting tool through the upper portion of the head and threadedly engaging the portion thereof below said slot.

5. A tool holder comprising a longitudinally slotted head, which slot extends transversely therethrough, the said head provided with a longitudinal recess extending to both sides of the said slot, a cutting tool disposed within said recess, a second cutting tool provided with a transversely extending plate, said plate slidably engaging the said head upon one side of the said slot, a clamping bolt engaging the said transversely extending plate and a portion of the head remote therefrom, adapted to lock the said plate into contact with the adjacent portion of the head and adapted to draw the upper portion of the head divided by the slot into forced contact with the first mentioned cutting tool, and means carried by said head engaging the second mentioned cutting tool for the transverse adjustment thereof.

6. A tool holder comprising a shank, a bifurcated head carried thereby, the bifurcation thereof extending longitudinally of the head and lying in a horizontal plane, said head provided with overhanging ledges above and below the said bifurcation, a cutting tool disposed between and gripped by said ledges, a second cutting tool carried by said head, means for adjusting said second mentioned cutting tool transversely of said head, said second mentioned cutting tool carrying an overhanging plate, and clamping means extending through and engaging said plate and the remote portion of said bifurcated head adapted to lock the second mentioned cutting tool to the upper portion of said bifurcated head and to resiliently draw the upper and lower portions into forced contact with the first mentioned cutting tool.

7. A tool holder comprising a shank, a head, said head provided with a longitudinal slot extending transversely therethrough, said head provided with a longitudinally extending recess extending above and below said slot, a tool positioned within said recess, a second cutting tool provided with a transversely extending plate, said plate slidably engaging the said head and adapted to move transversely thereof, a bolt carried by the said head extending transversely thereof and in engagement with the second mentioned cutting tool adapted to adjust the transverse position thereof, and a locking bolt contacting with the said transverse plate on the second mentioned cutting tool and engaging the remote portion of the head to thereby lock the said second mentioned cutting tool to the adjacent portion of the head, and to tend to draw together the remote and adjacent portions of the head to thereby lock the first mentioned cutting tool within the said recess.

8. A tool holder comprising a shank, a longitudinally slotted head, said slot extending transversely therethrough, the said head provided with an undercut recess extending longitudinally thereof, a beveled edge cutting tool positioned in said undercut recess, said undercut recess extending to both sides of the said slot, a second cutting tool provided with a body portion, said body portion provided with an outstanding plate with beveled edges, the said head provided with an undercut recess extending transversely thereacross receiving the beveled edged plate therein and mounting the same for sliding movement, the said plate provided with an elongated slotted aperture extending therethrough, a bolt extending through said plate slotted aperture and engaging the said head adapted to lock the said plate and second mentioned cutting tool in adjusted transverse positions, the said bolt further adapted to draw together the portions of the head upon opposite sides of said slot to draw the beveled walls of the undercut recess into forced contact with the beveled edges of the first mentioned cutting tool to lock the same in adjusted position, and a bolt carried by the said head extending through an aperture provided in the second mentioned cutting tool body portion adapted to vary the distance between the cutting tools.

In testimony that I claim the foregoing as my own, I have hereto affixed my signature in the presence of two witnesses.

FREDRICK A. WHITE.

Witnesses:
 MICHAEL AHEARN,
 RAY F. SHANK.

---

Copies of this patent may be obtained for five cents each, by addressing the "Commissioner of Patents, Washington, D. C."